Dec. 27, 1966 — J. H. COX ETAL — 3,293,863
APPARATUS AND METHOD FOR THAWING FROZEN GROUND
Filed Sept. 23, 1963
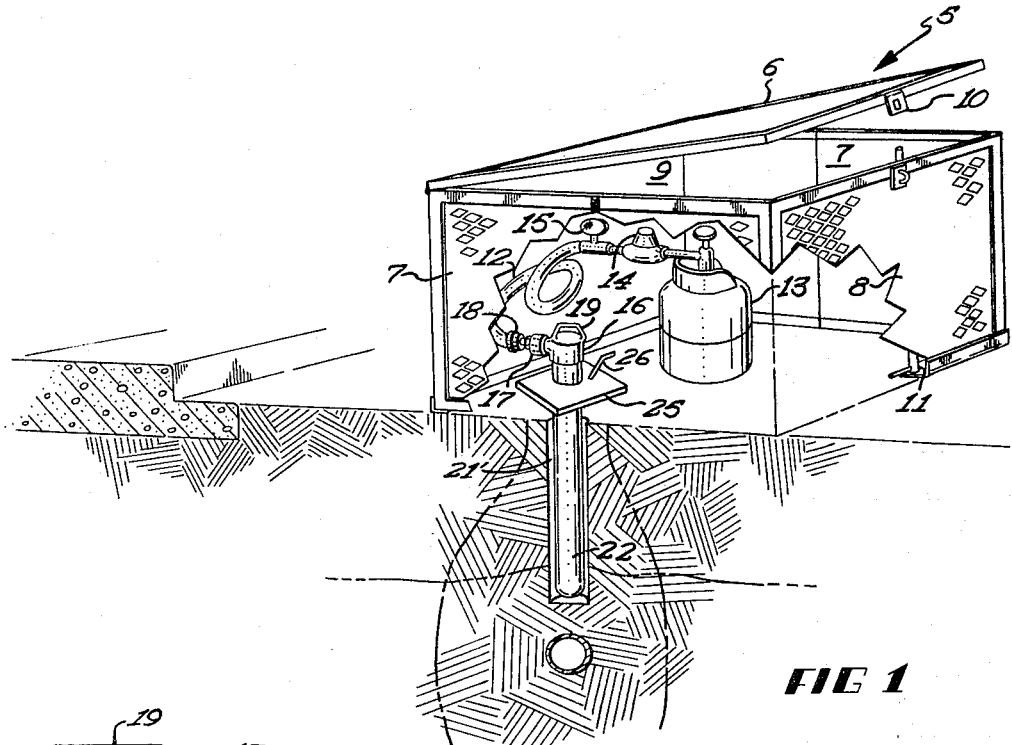
FIG 1
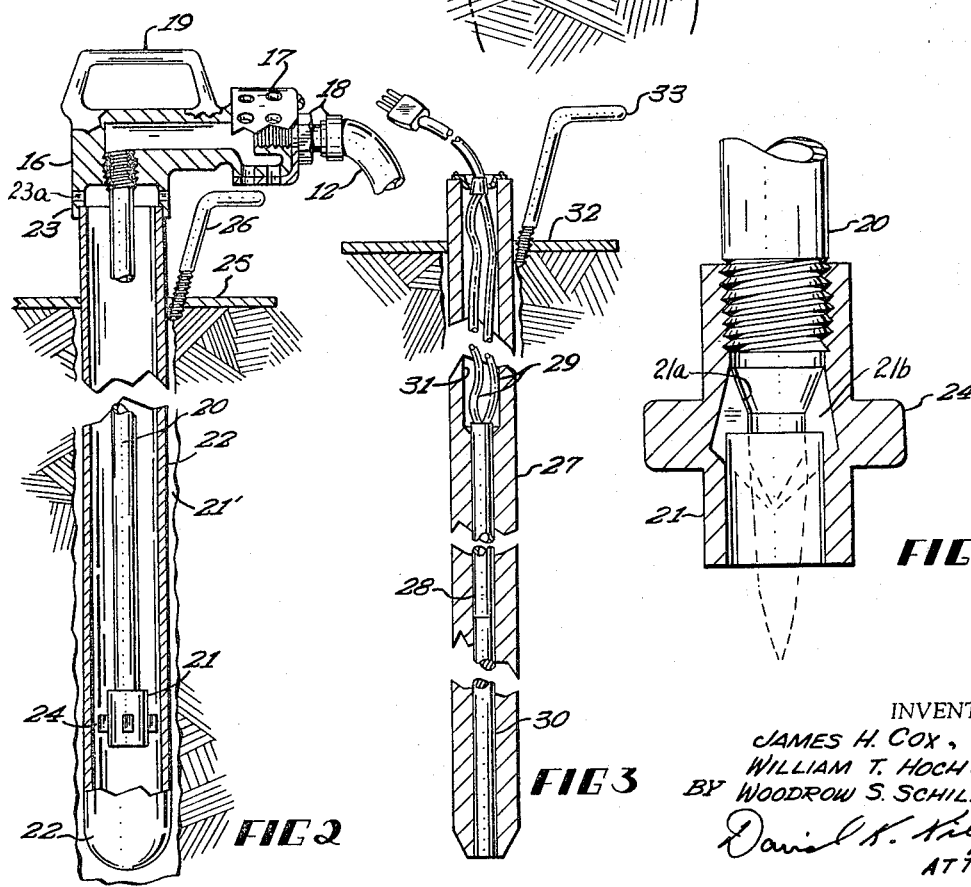
FIG 2
FIG 3
FIG 4
INVENTORS
JAMES H. COX,
WILLIAM T. HOCH,
BY WOODROW S. SCHILLING
David K. Kilgore
ATTORNEY United States Patent Office 3,293,863
Patented Dec. 27, 1966

3,293,863
APPARATUS AND METHOD FOR THAWING FROZEN GROUND
James H. Cox, 5232 Ewing Ave., S., Minneapolis, Minn. 55410, William T. Hoch, 4332 Fremont Ave., S., Minneapolis, Minn. 55409, and Woodrow S. Schilling, 1941 N. Snelling Ave., St. Paul, Minn. 55404
Filed Sept. 23, 1963, Ser. No. 310,688
2 Claims. (Cl. 61—36)

This invention relates broadly to the thawing of frozen ground when it becomes necessary to enter such ground during winter temperatures to reach sub-surface installations of public utility and the like; more particularly to the thawing of such frozen ground by means of a heating unit inserted in a hole drilled in said frozen ground whereby the heat from the said heating unit is introduced directly into the frozen ground via the drill hole.

It is well known, particularly in the case of public utility installation, that repair work on such installations when the ground is frozen is a costly operation from the standpoint of initially thawing the frozen ground generally accomplished by means of surface coke fires over the area to be worked, and the effect of using expensive ground breaking and digging apparatus in such frozen ground.

To overcome these present deficiencies in breaking and entering frozen ground, we have devised the present apparatus and method wherein the principal object of the invention consists in initially drilling a hole in the frozen ground preferably by means of a power driven auger and the insertion of a heating unit in the said drill hole whereby the said frozen ground is thawed in a relatively wide area from the surface to the full depth of the heating unit and substantially beyond that depth. This thawing effort of our present invention is accomplished in much less time than is now required by the embodiment of surface heat imparted by coke fires to accomplish the required thawing.

Another object of the invention is to provide means for thawing frozen ground in a specific area that is much more rapid and far less expensive than by means of the use of surface heat.

A further object of the invention is to provide means for thawing frozen ground in a specific area that has a far greater safety factor than the presently used surface coke fires.

A still further object of the invention is the embodiment with the heating unit of a cover plate adjustable thereon whereby the initial drill hole may be covered to prevent heat loss and to permit back-filling around the open end portion of the drill hole.

These and other objects of the invention will become apparent from the following specification and claims when taken in conjunction with the accompanying drawing which forms a part of this application and in which drawing, like characters indicate like parts throughout the several views.

To the above end, generally stated, the invention consists of the following devices and combination of devices hereinafter described and defined in the claims.

Referring to the drawing:

FIG. 1 is a perspective view of a typical embodiment of the invention including a tamper-proof safety cage enclosing the surface components of the invention.

FIG. 2 is an elevational view in section of the gas heated version of the heating unit inserted for operation in the initial drill hole.

FIG. 3 is an elevational view in section similar to FIG. 2 with the exception that an electric heated heating unit is illustrated, and, FIG. 4 is an elevational side view in section of the burner tip of the gas heating unit on an enlarged scale.

Referring now in detail to the drawing, the numeral 5 is directed to a foldable steel frame and wire guard cage having a hinged top 6, side members 7, and front and rear members 8 and 9 respectively. Provision is made in the form of a hasp 10 whereby the hinged top member 6 may be locked in closed position with a common padlock, not shown. A plurality of internally disposed eyes 11 are secured and arranged around the lower edge portion of the cage whereby the same may be spiked to the ground. This cage surrounding the installation affords protection for the elements contained therein against theft and tampering.

Contained within the cage 5 as shown in FIG. 1, are the elements of a typical gas heating unit installation all of which will presently be described in detail.

FIG. 2 illustrates the gas heating unit and comprises a fragmentary portion of flexible gas line 12, leading from a conventional L.P. tank 13, having a pressure regulator 14, and a pressure gauge 15, see FIG. 1, for the aforementioned L.P. gas components.

The gas burner unit comprises a horizontally offset housing 16 affording support for an atmospheric mixing head 17 having suitable fitting 18 to receive the discharge end portion of the flexible gas line 12. An upstanding handle member 19 is formed integral with the upper edge portions of the housing 16 to facilitate the handling and manipulation of the device.

A gas burner pipe 20 has screw threaded engagement with the lower edge portion of the housing 16 and is in communication wtih a horizontally disposed gas passageway centrally disposed in the said housing 16 and which is in communication with the gas supply line 12 and the atmospheric mixing head 17. The lower end portion of the gas burner pipe 20 is fitted wtih a highly efficient burner tip 21, see FIG. 4. As will be seen in FIG. 4, the interior of the burner tip 21 has a shouldered upper portion 21a provided with a plurality, as shown two, declined pilot passages 21b which extend through the shouldered tubular portion downwardly and inwardly towards the axis of the flame which is indicated in dotted lines in FIG. 4. The main flow of the combustive mixture extends axially through the interior of the burner 21 with combustion being produced within the lowermost annular portion of burner 21 and with combustion in the combustion chamber formed between the lower end of burner 21 and the closed end of the lower end of the casing 22.

This main passage of combustion mixtures causes a venturi action through the pilot ports 21b which is very desirable to secure lasting combustion under all conditions in the combustion chamber.

The entire burner unit and its mounted burner tip is housed within a relatively heavy steel casing 22 which has close fitting engagement with a depending annular flange 23 formed in the lower portion of the housing 16 and a plurality of circumferentially spaced bosses 24 formed integral with the burner tip 21 afforded means whereby the lower end portion of the burner pipe 20 to which said burner tip 21 is secured, is held spaced from the inner side walls of the steel casing 22. It will be seen from FIG. 2 that the annular flange or skirt 23 of housing 16 is provided with a plurality of spaced vent apertures 23a, serving to vent the products of combustion from the heat-conductive casing 22.

A heavy steel ground cover plate 25 having a centrally disposed bore dimensioned to receive the steel casing 22 with a close working fit is provided to be adjustably positioned at any point on said steel casing 22 and is held locked in such predetermined position by a relatively long locking screw 26 which has angular screw threaded engagement with the steel plate 25 adjacent the central bore therein. This locking screw 26 is so positioned on the steel plate 25 so that when the same is turned down it will impinge the steel casing 22 and lock said plate at ground level relative to the steel casing 22 as will presently be explained more in detail.

The electrically heated unit version of the invention comprises a relatively heavy casing 27 incorporating a high density heater unit 28 housed therein and having a recessed male electric fitting in its upper end portion to receive electric wire connections 29 from a suitable source of electric power. As shown in FIG. 3 the electric heater unit 28 has close fitting engagement with a longitudinally disposed central bore 30 formed in the casing 27 in the lower end portion thereof and an enlarged counter-bore 31 in the upper end portion thereof wherein is housed certain of the electric connections leading from the source of electric power to the electric heater unit 28.

It is to be noted that the electric version of the invention also embodies the use of the steel plate 32 and its locking screw 33 the purpose of which will presently appear.

Referring generally to both the gas heated and electrically heated version of the invention it will be understood that to make use of the same to thaw frozen ground it is first necessary to drill a hole 21' to receive either the casing 22 or 27 said hole being drilled substantially to the depth of the respective heater unit casings 22 or 27. For this purpose, a special drill applicable to mobile means such as a truck has been developed. An electric drill or air motor provided with an auger or frost bit of suitable size is employed for this purpose and the said soil material removed by the said auger is used to back-fill around the hole 21' said back-filling being placed on the respective steel plates 25 and 32.

As an example of making use of the invention in frozen ground, tests have been conducted in both clay and gravel having a frost level of sixty inches. In such tests both the gas heated unit and the electric heated unit were used and the results were found to be identical, said thaw rates being as follows:

In frozen gravel—with 8 hours of operation a two foot diameter circle at the surface is thawed. This diameter expands to four feet diameter at about 6" below the surface of the ground. It was found that the frost was removed all the way to the 60" depth.

In frozen clay—it was found that it was necessary to leave the Thawmaster unit on for 12 hours in order to thaw a hole two feet in diameter at the surface with this diameter expanding to 36" diameter at about 6" below the surface. Additional tests in clay showed a very small increase in thawed diameter for extended use of the Thawmaster. Sixteen hours increased the 36" hole to 38". Again the depth of the hole reached the full 60" of frost depth.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What we claim is:
1. A combustive, gas heated unit for thawing frozen ground below the surface, having in combination:
   an elongated heat-conductive tubular casing dimensioned for embedment longitudinally into the ground for some distance,
   said casing having an open, generally tubular upper end,
   a housing having a wall portion covering said open upper end and having a depending skirt closely fitting said open upper end,
   said housing having a longitudinal passage for conveying a mixture of gaseous fuel and air,
   a mixing head connected with an end portion of said passage and comprising an axial, relatively small gas conduit; and air intake means disposed outwardly and substantially concentrically of said gas conduit,
   a fitting connecting the outer end of said gas conduit with a source of gas supply under pressure,
   an elongated burner pipe rigidly secured at its upper end to said first mentioned wall of the housing and communicating with said passage in said housing, and extending downwardly axially in use within said conductive casing,
   said burner pipe being of substantially smaller diameter than the internal diameter of said casing and having a burner tip at its lower end,
   and venting means adjacent the upper end of said conductive casing for communicating said casing and said skirt with atmosphere outside of said housing.

2. The structure set forth in claim 1, wherein said housing has a body defining said longitudinal passage and extending substantially horizontally, said skirt which is closely fitted to the upper end of said heat conductive casing having its center disposed substantially perpendicularly to the axial center of said passage, and handle means affixed to said housing whereby said housing with said rigidly attached burner pipe may be readily carried and manipulated as a unit.

References Cited by the Examiner

UNITED STATES PATENTS

| | | | |
|---|---|---|---|
| 620,402 | 2/1899 | Anderson | 61—36.1 |
| 806,160 | 12/1905 | Metz | 256—26 |
| 944,382 | 12/1909 | Ross | 61—36.1 |
| 1,449,420 | 3/1923 | Kreager et al. | 166—59 |
| 1,678,592 | 7/1928 | Garner et al. | 166—59 |
| 2,018,003 | 10/1935 | Axtell | 111—7.1 |
| 2,041,312 | 5/1936 | Winder et al. | 126—91 |
| 2,145,473 | 1/1939 | Bilner | 61—36 X |
| 2,181,540 | 11/1939 | Adams | 111—7.1 |
| 2,255,540 | 9/1941 | Dreffein | 126—91 |
| 2,475,416 | 7/1949 | Williams | 256—25 |
| 2,514,509 | 7/1950 | O'Neal | 61—36.1 |
| 2,753,431 | 7/1956 | Ruff | 61—36.1 X |
| 2,824,604 | 2/1958 | Reed | 158—116 |
| 2,858,676 | 11/1958 | Ross | 61—36 |
| 2,906,056 | 9/1959 | Youngblood | 111—7.1 X |
| 3,142,273 | 7/1964 | Dilts | 111—7.1 |

FOREIGN PATENTS 597,701    1946    Great Britain.

CHARLES E. O'CONNELL, *Primary Eaxminer.*
JACOB SHAPIRO, *Examiner.*